Nov. 6, 1934.  L. E. BARRINGER  1,980,151
ABRADANT MATERIAL AND PROCESS OF ITS MANUFACTURE
Original Filed Dec. 3, 1926
Abrasive Device
Binder Comprises Polybasic Acid – Polyhydric Alcohol Resin
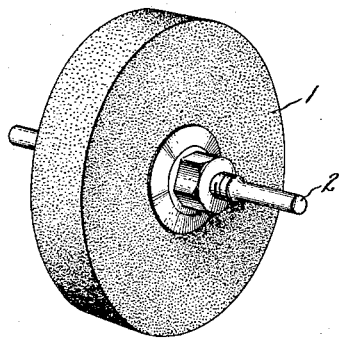
Inventor:
Lawrence E Barringer,
by
His Attorney.

Patented Nov. 6, 1934

1,980,151

UNITED STATES PATENT OFFICE 1,980,151

ABRADANT MATERIAL AND PROCESS OF ITS MANUFACTURE

Lawrence E. Barringer, Schenectady, N. Y., assignor to General Electric Company, a corporation of New York Application December 3, 1926, Serial No. 152,486
Renewed September 8, 1930

8 Claims. (Cl. 51—280)

The present invention relates to the manufacture of abradants, such for example, as grinding wheels, whetstones, razor hones, drills, sand paper and in general articles used for grinding or abrading purposes.

A binder for abrasive articles should not only give the article mechanical strength but should have such physical properties that the abrasive material can be used without deterioration of its cutting property. For example the binder must not clog or gum the abrading surface when the surface is subjected to frictional heating during use. The binder must retain its bonding strength at high temperatures so as not to permit frictional disintegration of the surface layer. For some abradants, as in sand paper, elasticity of the binder is desirable. For some abradants immunity to moisture is important. The binder should not readily decompose or carbonize when heated.

I have found resins of the polyhydric alcohol polybasic acid class to have the special physical properties required for binders in high grade abrasive materials. These resins not only possess a high degree of strength and elasticity but are able to withstand high temperatures without decomposition. They do not clog the surface layers of abradants made by their use as binders. My invention comprises both new abradant compositions and a new method of fabricating the same. The accompanying drawing illustrates in perspective one particular device embodying my invention.

In carrying out my invention a comminuted abrasive material, such as alundum, carborundum, emery, garnet, or the like is mixed with a suitable amount of polybasic acid-polyhydric alcohol resin of the class described in Callahan Patents 1,108,329 and 1,108,330 of August 25, 1914. This class of resins will be referred to in the appended claims generally as alkyd resins. Alkyd resins include all those complexes resulting primarily from the inter-reaction of a polyhydric alcohol, such as glycerol, and a polybasic acid, such as phthalic anhydride.

Alkyd resins are convertible by heating from a fusible state (A-stage) to a very tough, hard, inert, and non-fusible state (C-stage). In an intermediate state (B-stage) the resin is less inert. In the B-stage the resin will not fuse but softens somewhat when heated. The A-stage resin is readily soluble in cold acetone. The B-stage and C-stage resin can be rendered soluble by heating with a solvent at sufficiently elevated temperatures.

Preferably but not necessarily the resin is associated with a plasticizing agent, such for example, as indene, indene polymer, tricresyl phosphate, diethyl phthalate, glycol diacetate, benzyl benzoate, triacetin, or the like.

The alkyd resin may be mixed with a suitable amount of plasticizing agent, say ten per cent, at any of its conversion stages, for example, the resin can be incorporated with a solvent by heating the resin, preferably in powdered form, in contact with a solvent to a sufficiently high temperature until the resin structure is altered and solution occurs. Enough of the liquid plasticizing agent should be removed from the resin to permit a solidified product to be obtained or else a solid plasticizing agent may be used, such as cumar, rosin, ester gum, a pitch, diphenyl or even a natural gum.

The resin binder may be incorporated with the abrasive material in any suitable way so as to get a complete distribution of the resin throughout the mass. For example, the comminuted abrasive may be incorporated with a solution of the resin in a suitable solvent, such as acetone, or mixed solvents as acetone, alcohol and benzol or alcoholic solutions of ammonia. Complete admixture may be assured by stirring the mass, as for example, in a heated dough mixer. In other cases the comminuted abrasive may be mixed with liquefied resin in a suitable mixing device, preferably at an elevated temperature. By another method the solid resin is powdered, preferably to a fineness which will pass through a 60 mesh screen, and then mixed with the abrasive. Any of the foregoing methods of mixing may be used. I do not wish to be limited to these particular methods for any procedure whereby the abrasive and resin particles are brought into intimate contact to form a thorough mixture is satisfactory for the purpose. When the mixture is to be used for coating cloth or paper, I prefer to first coat the paper with a solution of alkyd resin, then air dry until tacky, apply the grains of abrasive material and finally bake the whole until the grains are firmly set in the resinous coating. The proportion of resin to abrasive will vary with conditions but by way of example, I may state that I have used successfully 60 parts of abrasive, such as alundum, with 5 parts of a resin made from glycerol and phthalic anhydride.

The abrasive and resin mixture may be molded at about 150° C. preferably in steel molds. The molding mass is held at this temperature for a few minutes, the exact time depending on the size of the mass and other conditions. The molded objects may be cooled in the mold to about 75° C. Thereupon the molded pieces are discharged from the mold and the resin is fully polymerized without pressure (other than atmospheric pressure) in an oven for a protracted period, say 50 to 150 hours depending upon the size of the article at a temperature rising gradually from about 75° C. to about 190° C. This heat treatment or polymerization, which is given the articles after the binder has been given an initial set by molding, develops to the fullest degree the strength of the resinous bond and therefore the mechanical strength and toughness of the finished article.

The resulting product, one example of which, namely, a grinding wheel 1 has been illustrated as mounted on a shaft 2 for rotation, is strong, moisture-resistant, and can be used under severe service conditions without gumming or clogging of the surface. Apparently the local high temperatures produced at the cutting surface by frictionally-developed heat during use volatilize any resin which may tend to accumulate at the surface by the wearing away of the abrasive material. In fact, this class of resins themselves have an abradant action on cutting tools and it appears that the presence of small amounts of resin at the surface does not appreciably lower the abrading or grinding effect of the abrasive material.

In a divisional application, Serial No. 402,801, filed Oct. 26, 1929, and assigned to the same assignee as the present invention I have made claims on a flexible sheet material coated with an alkyd resin in which particles of abrasive are embedded.

What I claim as new and desire to secure by Letters Patent of the United States, is:

1. A grindstone comprising a preponderant proportion of particles of abrasive and a lesser proportion of alkyd resin in a tough, hard, moisture-resistant, non-fusible state.

2. A grindstone comprising particles of abrasive, a binder of alkyd resin, and a plasticizing agent for said resin.

3. A grindstone comprising particles of abrasive material bonded with a glycerol-phthalate resin in the infusible, insoluble state.

4. The process of making an abradant which consists in molding a mixture of an abrasive material with an alkyd resin associated with a solvent at an elevated temperature, and thereupon subjecting the molded article to a prolonged heat treatment.

5. The process of making an abradant which consists in molding a mixture of an abrading material and an incompletely condensed glycerol-phthalate resin under pressure at a temperature of about 150° C. and thereupon heating without pressure other than atmospheric for about 50 to 150 hours at a temperature gradually rising from about 75° C. to 190° C.

6. A grinding wheel comprising particles of an abrasive material and an infusible, insoluble resinous compound of glycerine and phthalic anhydride.

7. A grinding wheel comprising particles of an abrasive material, an infusible, insoluble resinous compound of glycerine and phthalic anhydride and a plasticizing agent for said resin.

8. An abradant comprising a major proportion of particles of abrasive material, bonded together with an alkyd resin in the infusible, moisture-resistant state.

LAWRENCE E. BARRINGER.